(12) United States Patent
Shivalinga et al.

(10) Patent No.: US 10,759,605 B1
(45) Date of Patent: Sep. 1, 2020

(54) BLIND SPACER ASSEMBLY FOR CARGO HANDLING SYSTEM ROLLERS

(71) Applicant: Goodrich Corporation, Charlotte, NC (US)

(72) Inventors: Vinodkumar Shivalinga, Bangalore (IN); Venkatesh Chitragar, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 16/797,622

(22) Filed: Feb. 21, 2020

(30) Foreign Application Priority Data

Jan. 3, 2020 (IN) .............................. 202041000268

(51) Int. Cl.
| | |
|---|---|
| *B65G 13/11* | (2006.01) |
| *B65G 13/00* | (2006.01) |
| *B65G 13/12* | (2006.01) |
| *B64D 9/00* | (2006.01) |

(52) U.S. Cl.
CPC ............... *B65G 13/11* (2013.01); *B64D 9/00* (2013.01)

(58) Field of Classification Search
CPC ......... B65G 13/00; B65G 13/11; B65G 13/12
USPC ................................... 198/780; 193/35 R, 37
See application file for complete search history.

(56) References Cited

U.S. PATENT DOCUMENTS

| | | | | |
|---|---|---|---|---|
| 3,655,021 A | * | 4/1972 | Froio ................... | B65G 13/075 |
| | | | | 193/35 A |
| 4,059,180 A | * | 11/1977 | Krivec ................... | B65G 39/09 |
| | | | | 193/37 |
| 4,148,386 A | * | 4/1979 | Bradbury ............... | B65G 39/09 |
| | | | | 193/37 |
| 4,376,555 A | * | 3/1983 | Grass ................... | A47B 88/437 |
| | | | | 384/18 |
| 4,730,723 A | * | 3/1988 | Mossot ................. | B65G 39/04 |
| | | | | 198/827 |
| 5,261,528 A | * | 11/1993 | Bouchal ................ | B65G 39/09 |
| | | | | 198/842 |
| 5,645,155 A | * | 7/1997 | Houghton ............. | B65G 39/12 |
| | | | | 193/35 R |
| 5,655,642 A | * | 8/1997 | Lawrence ............. | B65G 39/04 |
| | | | | 193/37 |
| 5,857,554 A | * | 1/1999 | Toye ...................... | B65G 39/09 |
| | | | | 193/35 R |
| 5,865,290 A | * | 2/1999 | Scott ..................... | B65G 39/12 |
| | | | | 193/37 |
| 6,034,793 A | * | 3/2000 | Park ...................... | B65G 39/02 |
| | | | | 358/498 |
| 6,267,373 B1 | * | 7/2001 | Takata .................... | B65H 5/06 |
| | | | | 193/37 |
| 6,612,422 B2 | | 9/2003 | Roberts et al. | |
| 6,702,091 B2 | | 3/2004 | Nimmo et al. | |
| 7,051,554 B2 | * | 5/2006 | Hart ...................... | B21B 39/008 |
| | | | | 193/37 |
| 7,201,713 B2 | * | 4/2007 | Lane ..................... | B65G 39/09 |
| | | | | 492/39 |

(Continued)

*Primary Examiner* — Douglas A Hess
(74) *Attorney, Agent, or Firm* — Snell & Wilmer L.L.P.

(57) ABSTRACT

A blind spacer assembly may comprise an outer sleeve and a pin located through the outer sleeve. A first and second pawl may be configured to rotate about the pin. A collar may be coupled to the outer sleeve and located over the pin. A nut may be located in the outer sleeve. A screw may be in threaded engagement with the nut.

20 Claims, 10 Drawing Sheets

(56) References Cited

U.S. PATENT DOCUMENTS

| | | | | |
|---|---|---|---|---|
| 8,591,116 B2* | 11/2013 | Fedorovich | ............ | B65G 39/09 |
| | | | | 277/412 |
| 8,720,662 B2* | 5/2014 | Arsenenau | ............ | B65G 39/09 |
| | | | | 193/37 |
| 8,967,371 B2* | 3/2015 | Dunn | .................. | B65G 39/125 |
| | | | | 198/780 |
| 9,108,798 B2* | 8/2015 | Dsaak | ...................... | F27B 5/12 |
| 9,535,389 B2* | 1/2017 | Muramatsu | .......... | B65H 3/0638 |
| 10,287,101 B2* | 5/2019 | Dubois | ................ | C03B 35/181 |
| 10,507,977 B2* | 12/2019 | Baer | ...................... | B65G 13/02 |
| 10,583,992 B2* | 3/2020 | Clark | .................... | B65G 39/02 |
| 2009/0045029 A1 | 2/2009 | Deur | | |

* cited by examiner

BLIND SPACER ASSEMBLY FOR CARGO HANDLING SYSTEM ROLLERS

CROSS REFERENCE TO RELATED APPLICATIONS

This application claims priority to and the benefit of, India Patent Application No. 202041000268 filed Jan. 3, 2020 and entitled "BLIND SPACER ASSEMBLY FOR CARGO HANDLING SYSTEM ROLLERS," which is hereby incorporated by reference in its entirety.

FIELD

The present disclosure relates generally to cargo handling systems, and more specifically, to a blind spacer assembly for cargo handling system rollers.

BACKGROUND

Cargo handling systems, such as those used by aircraft for transport of containerized cargo or pallets, also referred to as unit load devices (ULDs), typically include roller trays containing transport rollers positioned along a cargo bay floor to facilitate movement of the ULDs relative to the bay floor. The rollers may be secured to the trays via spacers that extend between the side rails of the trays and about which the rollers spin. Clips, or other spacer securement means, may be attached to the spacer to secure the spacer to the tray. Some of the rollers, for example, rollers that are located over the fasteners used to attach the trays to the cargo bay floor, may be attached to the trays after the tray is affixed to the cargo bay floor. Attaching the clip, or other securement means, to the spacer after the tray is fastened to the cargo bay floor can be difficult, as access to the end of the spacer that receives the clip, or securement means, may be limited.

SUMMARY

A blind spacer assembly for a cargo handling system roller is disclosed herein. In accordance with various embodiments, the blind spacer assembly may comprise an outer sleeve, a pin located through the outer sleeve, and a first pawl configured to rotate about the pin. The pin may be perpendicular to a center axis of the outer sleeve.

In various embodiments, the outer sleeve may define a head portion having a first diameter and a shaft portion having a second diameter less than the first diameter. In various embodiments, in an unlocked state, the first pawl may be radially inward of a radially outward surface of the shaft portion of the outer sleeve, and in a locked state, a portion of the first pawl may be located radially outward of the radially outward surface of the shaft portion of the outer sleeve.

In various embodiments, a nut may be located in the outer sleeve, and a screw may be in threaded engagement with the nut. Translation of the screw towards the pin may be configured to rotate the first pawl in a first circumferential direction about the pin. In various embodiments, a second pawl may be configured to rotate about the pin. Translation of the screw towards the pin may be configured to rotate the second pawl in a second circumferential direction about the pin opposite the first circumferential direction.

In various embodiments, a retaining ring may be located in the outer sleeve. A head of the screw may be located between the retaining ring and the nut. In various embodiments, a nut orifice defined by the outer sleeve may comprise a D-shape. In various embodiments, an outer surface of the head portion of the outer sleeve may be configured in a D-shape.

In various embodiments, a collar may be located over the pin. In various embodiments, the outer sleeve may further comprise a pawl portion having a third diameter less than the second diameter of the shaft portion, and the pin may be located through a pin orifice defined by the pawl portion of the outer sleeve. In various embodiments, the pawl portion may define a pawl channel configured to receive the first pawl.

A roller tray for a cargo handling system is also disclosed herein. In accordance with various embodiments, the roller tray may comprise a first vertical wall defining a first spacer orifice, a second vertical wall defining a second spacer orifice, a roller located between the first vertical wall and the second vertical wall, and a blind spacer assembly located through the first vertical wall, the roller, and the second vertical wall. The blind spacer assembly may comprise an outer sleeve, a pin located through the outer sleeve, and a first pawl configured to rotate about the pin. The pin may be perpendicular to a center axis of the outer sleeve.

In various embodiments, the blind spacer assembly may further comprise a nut located in the outer sleeve and a screw in threaded engagement with the nut. Translation of the screw towards the pin may be configured to rotate the first pawl in a first circumferential direction about the pin.

In various embodiments, the blind spacer assembly may further comprise a second pawl configured to rotate about the pin. Translation of the screw towards the pin may be configured to rotate the second pawl in a second circumferential direction about the pin opposite the first circumferential direction.

In various embodiments, the first pawl may include a first protrusion oriented away from the second pawl, and the second pawl may include a second protrusion oriented away from the first pawl. The pin may be located through the first protrusion and the second protrusion.

In various embodiments, the outer sleeve of the blind spacer assembly may define a shaft orifice having a first diameter, a nut orifice having a second diameter greater than the first diameter, and head orifice having a third diameter greater than the second diameter. In various embodiments, the outer sleeve may further define a retaining ring orifice having a fourth diameter greater than the third diameter. In various embodiments, the outer sleeve may further define a pawl orifice having a fifth diameter greater than the first diameter.

A blind spacer assembly, in accordance with various embodiments, may comprise an outer sleeve, a pin located through the outer sleeve, a first pawl configured to rotate about the pin; a second pawl configured to rotate about the pin, a collar coupled to the outer sleeve and located over the pin, a nut located in the outer sleeve, and a screw in threaded engagement with the nut.

In various embodiments, translation of the screw towards the pin may be configured to rotate the first pawl and the second pawl about the pin and to a position wherein at least a portion of at least one of the first pawl or the second pawl is located radially outward of a radially outward surface of the outer sleeve.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION OF THE DRAWINGS

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical electrical, thermodynamic, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Throughout the present disclosure, like reference numbers denote like elements. Accordingly, elements with like element numbering may be shown in the figures, but may not necessarily be repeated herein for the sake of clarity.

A first component that is "radially outward" of a second component means that the first component is positioned at a greater distance away from a common axis of the first and second components as compared to the second component. A first component that is "radially inward" of a second component means that the first component is positioned closer to a common axis of the first and second components as compared to the second component.

Figure 1:
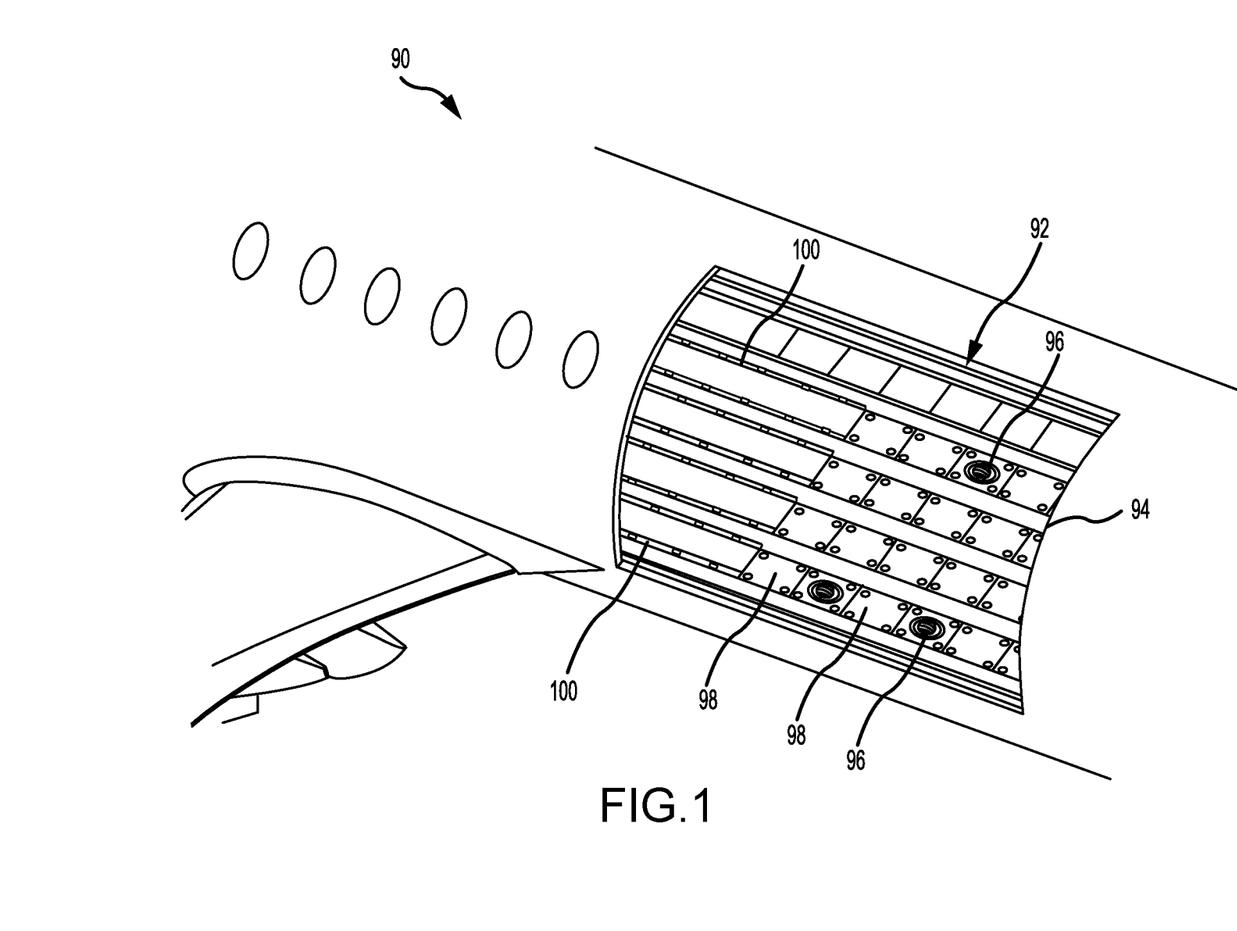
FIG. 1 illustrates an aircraft cargo compartment, in accordance with various embodiments.

With reference to FIG. 1, an aircraft 90 is illustrated having a cargo compartment 92. A cargo door 94 provides access to cargo compartment 92 from outside aircraft 90. In various embodiments, cargo compartment 92 may be equipped with one or more power drive units (PDUs) 96 configured to propel cargo and/or ULDs across cargo compartment 92. Cargo compartment 92 may include one or more ball mats 98 having a plurality of freely rotating conveyance balls. Cargo compartment 92 further includes one or more roller trays 100 extending longitudinally along a length of cargo compartment 92.

Figure 2A:
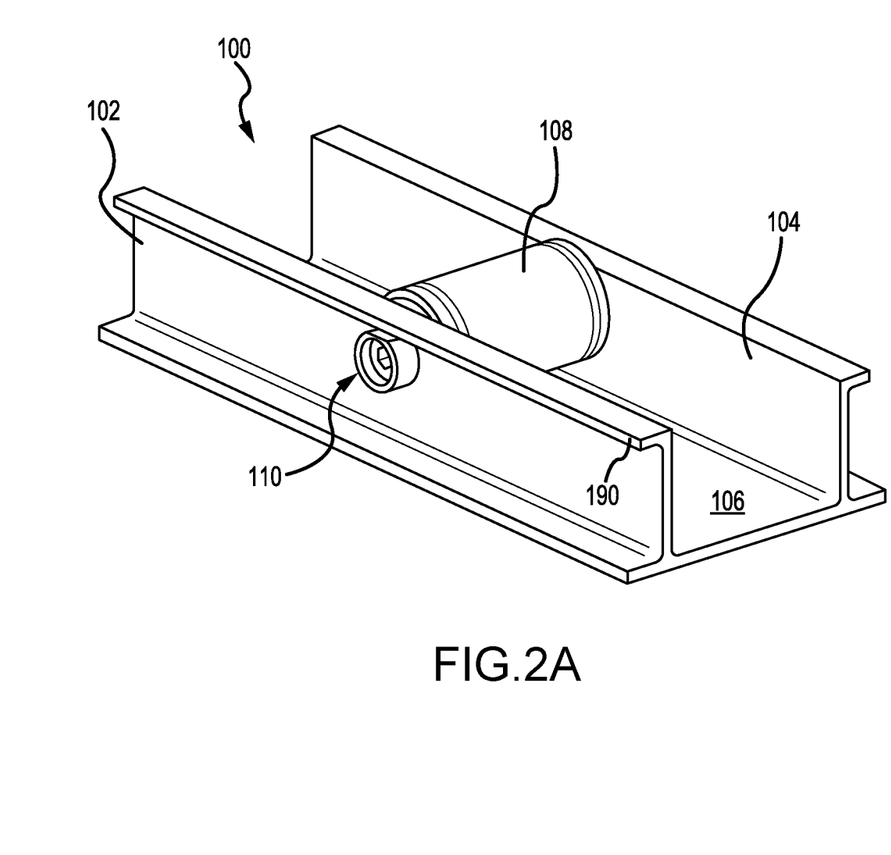
FIG. 2A illustrates a perspective view of a roller located in a roller tray, in accordance with various embodiments.

With reference to FIG. 2A, a portion of a roller tray 100 is illustrated. Roller tray 100 includes a pair of vertical walls, including first vertical wall 102 and second vertical wall 104. First and second vertical walls 102, 104 extend from a floor 106 of the roller tray. In accordance with various embodiments, roller tray 100 further includes one or more roller(s) 108. Roller 108 is located between first vertical wall 102 and second vertical wall 104. Roller 108 may be coupled to first and second vertical walls 102, 104 via a blind spacer assembly 110. Roller 108 may be configured to rotate about blind spacer assembly 110.

Figure 2B:
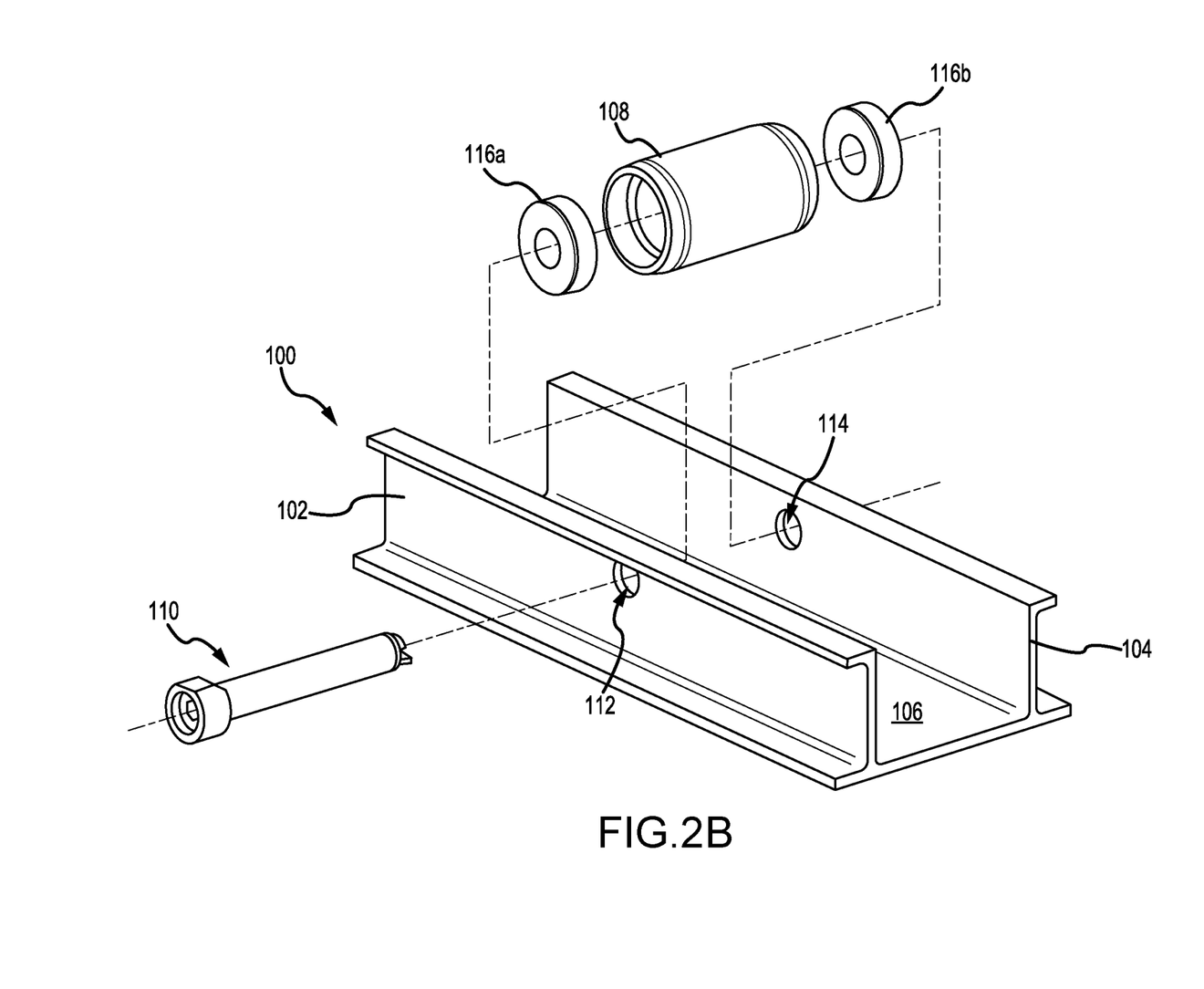
FIG. 2B illustrates an assembly view for attaching a roller to a roller tray, in accordance with various embodiments.

With reference to FIG. 2B, roller 108 may be secured to first and second vertical walls 102, 104 by locating blind spacer assembly 110 through a spacer opening 112 defined by first vertical wall 102, a pair of bearings 116a, 116b configured to facilitate rotation of roller 108, and a spacer opening 114 defined by second vertical wall 104. After installation (i.e., after locating blind spacer assembly 110 through first and second vertical walls 102, 104, blind spacer assembly 110 may be translated to a locked state. When in a locked state, blind spacer assembly 110 generates an interference with second vertical wall 104, thereby securing blind spacer assembly 110 and roller 108 to roller tray 100. Blind spacer assembly 110 may allow roller 108 to be quickly installed in roller tray 100 and, as described in further detail below, may reduce unauthorized removal of blind spacer assembly 110 from roller tray 100.

Figure 3A:
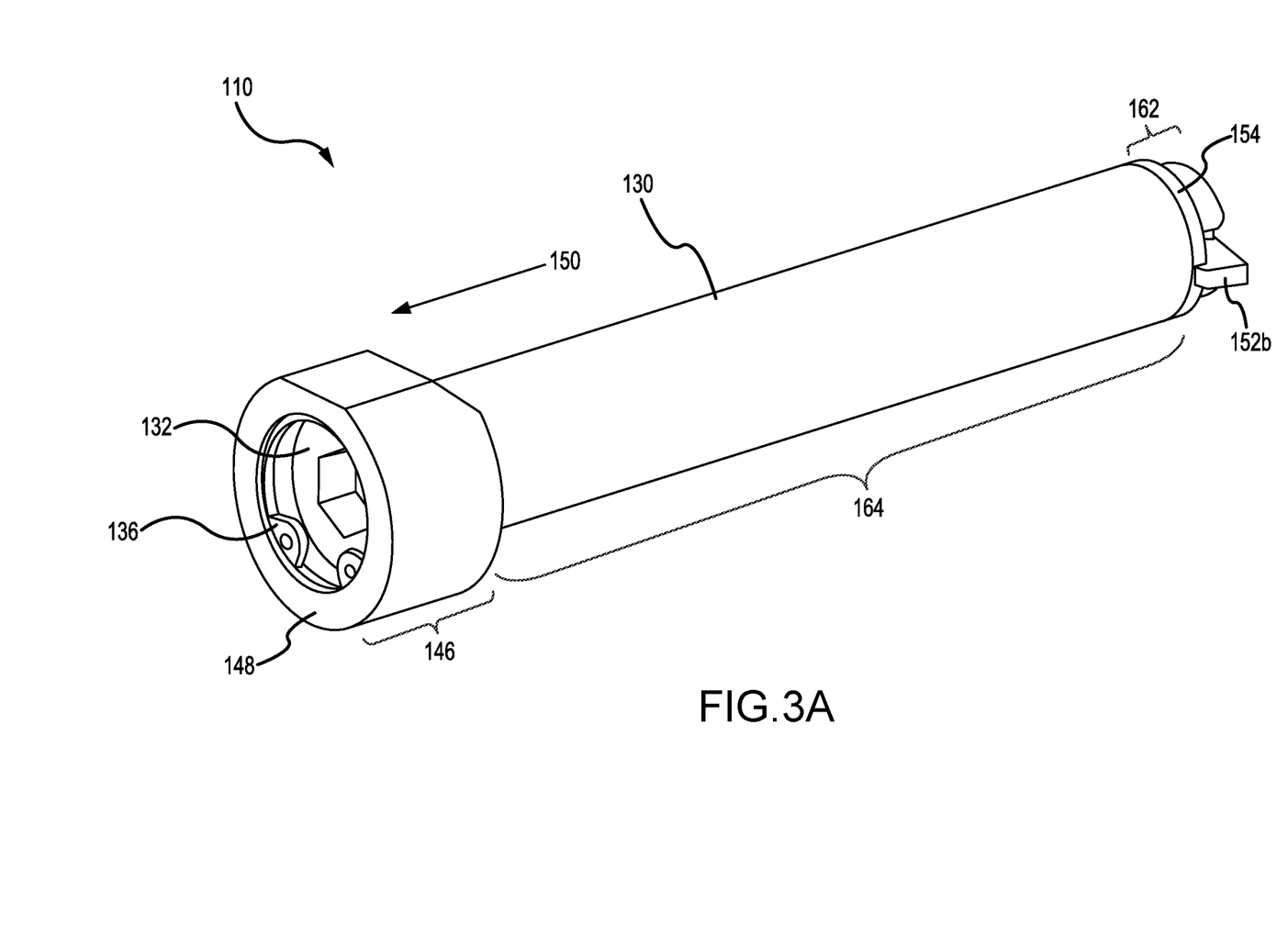
FIG. 3A illustrates a perspective view of a blind spacer assembly for a cargo handling system roller, in accordance with various embodiments.
Figure 3B:
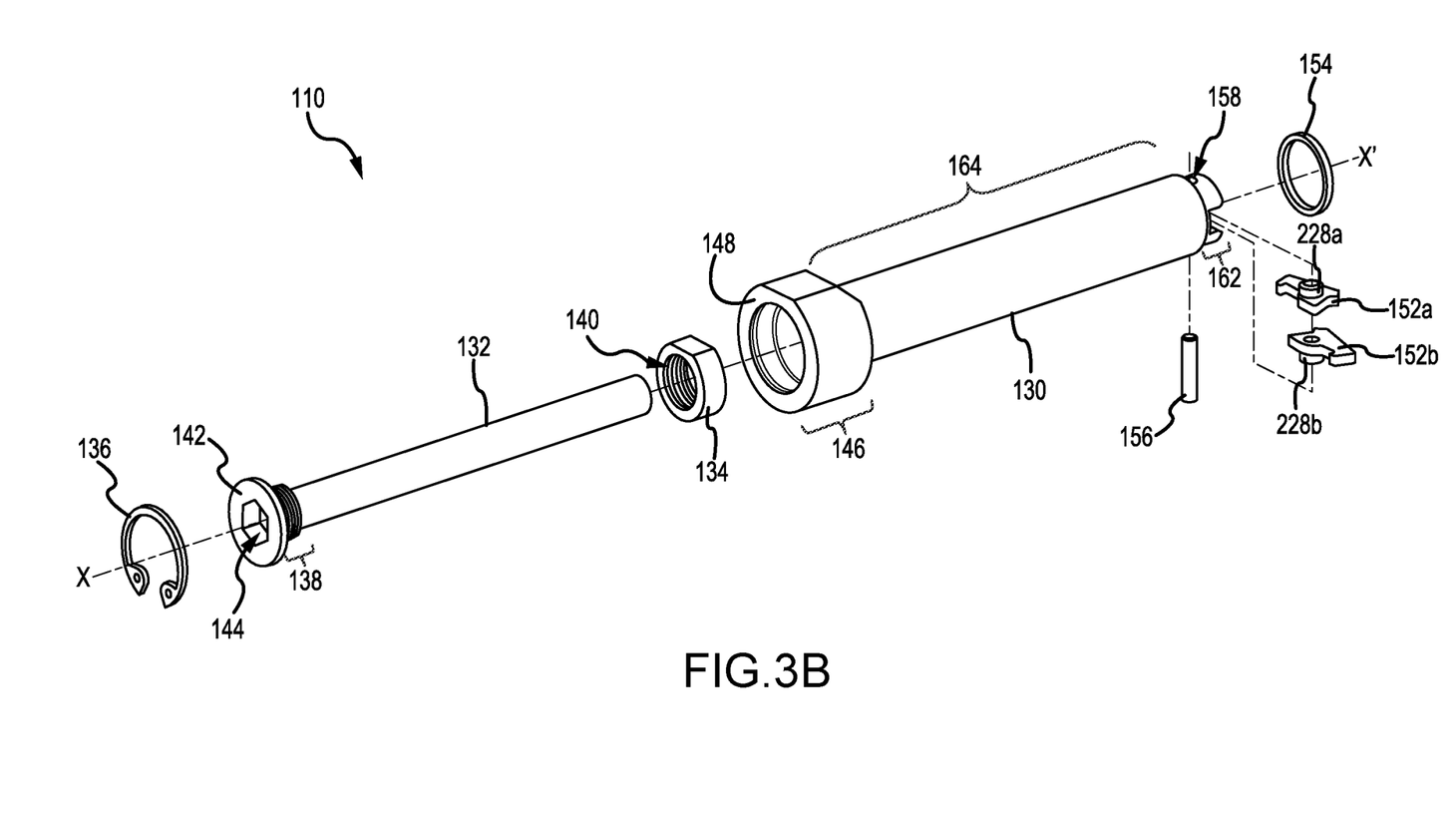
FIG. 3B illustrates an assembly view of a blind spacer assembly for a cargo handling system roller, in accordance with various embodiments.

Referring to FIGS. 3A and 3B, a blind spacer assembly 110 is illustrated. In accordance with various embodiments, blind spacer assembly 110 includes an outer sleeve 130 and screw 132. Outer sleeve 130 is configured to receive screw 132. blind spacer assembly 110 may further include a nut 134 and a retaining ring 136. Screw 132 may be located through nut 134. Screw 132 includes a threaded portion 138 configured to engage a threaded inner surface 140 of nut 134. A head 142 of screw 132 defines a tool orifice 144. In various embodiments, the shape of tool orifice 144 is selected to receive a specialized tool having a complementary shape. Nut 134, head 142 of screw 132, and retaining ring 136 may be located in a head portion 146 of outer sleeve 130. Head 142 may be located between nut 134 and retaining ring 136. Retaining ring 136 may be a split ring. Retaining ring 136 is configured to limit translation of screw 132 in a direction toward end 148 of outer sleeve 130 (i.e., in the direction of arrow 150). In accordance with various embodiments, nut 134 may comprise a "D" shape. In this regard, the outer circumferential surface of nut 134 may have a flat, or planar, portion connecting a curved, or rounded portion. The shape of nut 134 is configured to limit, or prevent, rotation of nut 134 within outer sleeve 130.

In accordance with various embodiments, blind spacer assembly 110 further includes a pair of pawls 152a, 152b, a collar 154, and a pin 156. Pin 156 is located through pawls 152a, 152b and through a pin orifice 158 defined by outer sleeve 130. In various embodiments, pin 156, pawls 152a, 152b, and collar 154 are coupled to a pawl portion 162 of outer sleeve 130. Pawl portion 162 is axially opposite head portion 146. A shaft portion 164 of outer sleeve 130 extends between head portion 146 and pawl portion 162. Pawls 152a, 152b may rotate about pin 156. Collar 154 is coupled to outer sleeve 130 and located over pin 156. In various embodiments, collar may be press fit over pin 156 and pawl portion 162. In this regard, frictional forces may secure collar 154 to outer sleeve 130. Collar 154 tends to prevent pin 156 from translating out pin orifice 158.

Figure 4A:
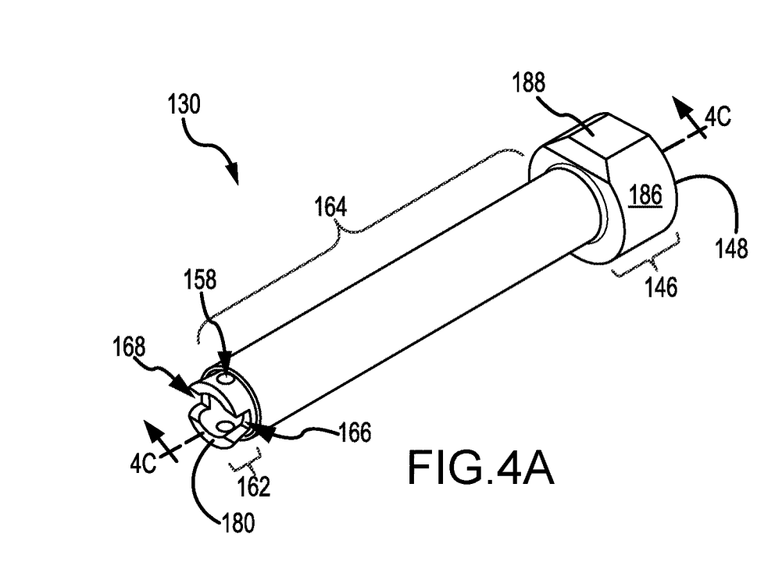
FIGS. 4A, 4B, and 4C illustrate an outer housing of a blind spacer assembly, in accordance with various embodiments.
Figure 4B:
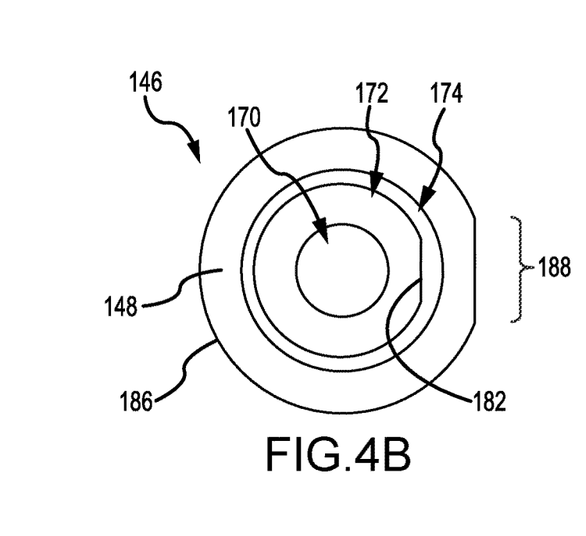
Figure 4C:
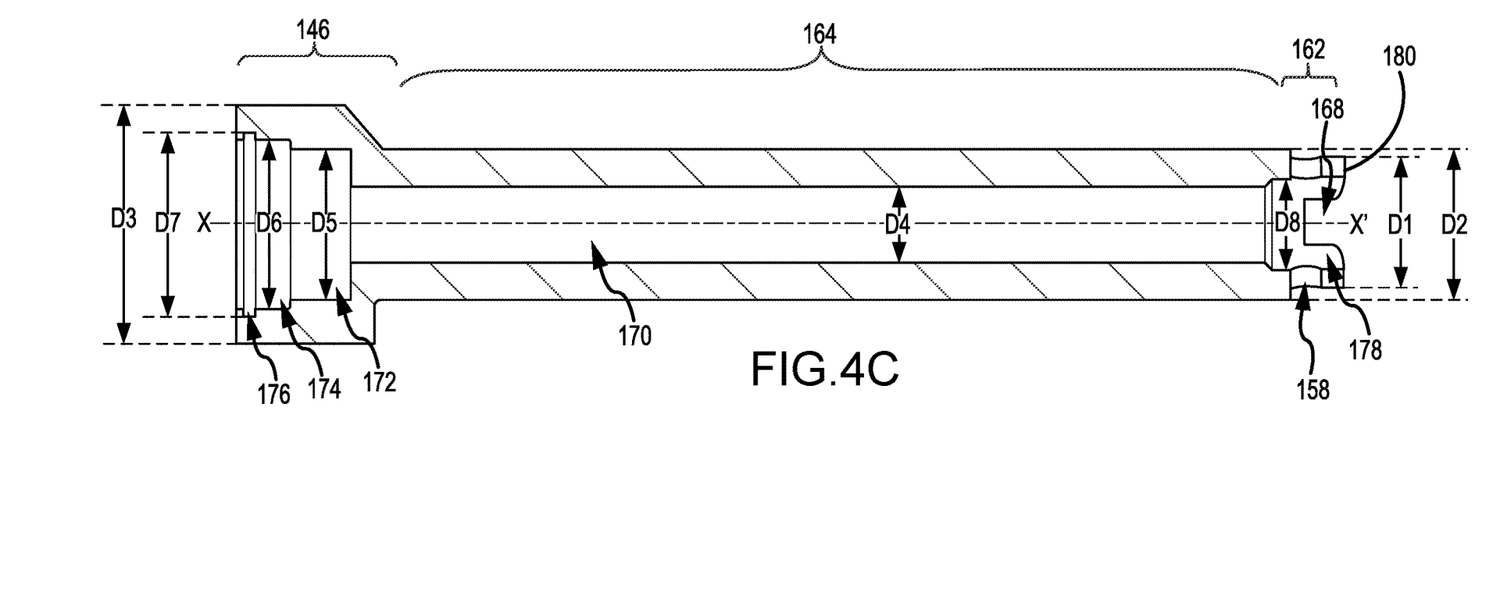

With reference to FIGS. 4A, 4B, and 4C, outer sleeve 130 is illustrated. FIG. 4A illustrates a perspective view of outer sleeve 130. FIG. 4B illustrates an axially facing view of head portion 146 of outer sleeve 130. FIG. 4C illustrates a cross-section view of outer sleeve 130 take along the line 4C-4C in FIG. 4A.

Pawl portion 162 of outer sleeve 130 defines pin orifice 158. Pawl portion 162 may further define pawl channels 166, 168. Pawl channels 166, 168 are configured to receive pawls 152a, 152b, with momentary reference to FIG. 3B. Pawl channels 166, 168 may each be located approximately 90°, about a center axis X-X' of outer sleeve 130, from pin orifice 158. Screw 132 in FIG. 3A and/or roller 108 in FIG. 2A may rotate about center axis X-X'. As used herein, the terms "axial" and "axially" refer to directions parallel to center axis X-X', the terms "radial" and "radially" refer to direction perpendicular to center axis X-X', and the terms "circumferential" and "circumferentially" refer to directions about center axis X-X'. In accordance with various embodiments, pin 156, with momentary reference to FIG. 5A, may be perpendicular to center axis X-X' of outer sleeve 130.

With reference to FIG. 4C, in accordance with various embodiments, a diameter D1 of pawl portion 162 of outer sleeve 130 may be less than a diameter D2 of shaft portion 164. A diameter D3 of head portion 146 is greater than the diameter D2 of shaft portion 164. In accordance with various embodiments, shaft portion 164 define a shaft orifice 170 having a diameter D4. Shaft orifice 170 is configured to receive a shaft of screw 132, with momentary reference to FIG. 3B. Head portion 146 defines a nut orifice 172 having a diameter D5, a head orifice 174 having a diameter D6, and a ring orifice 176, having a diameter D6. Nut orifice 172 is configured to receive nut 134, with momentary reference to FIG. 3B. Head orifice 174 is configured to receive head 142 of screw 132, with momentary reference to FIG. 3B. Ring orifice 176 is configured to receive retaining ring 136, with momentary reference to FIG. 3B. Diameter D5 of nut orifice 172 may be greater than diameter D4 of shaft orifice 170 and less than diameter D6 of head orifice 174. Diameter D7 of ring orifice 176 may be greater than diameter D6 of head orifice 174. In various embodiments, pawl portion 162 may define a pawl orifice 178 having a diameter D8. Pawl orifice 178 may extend from an end 180 of outer sleeve 130 to shaft orifice 170. Diameter D8 may be greater than diameter D4 of shaft orifice 170.

With combined reference to FIG. 4B and FIG. 4C, head orifice 174 may have a generally circular shape. Stated differently, a cross-section of head orifice 174 taken in a radial plane perpendicular to center axis X-X' is generally circular in shape. Nut orifice 172 may have a D-shape, which complements the D-shape of nut 134, with momentary reference to FIG. 3B. Stated differently, a cross-section of nut orifice 172 taken in a radial plane perpendicular to center axis X-X' is generally "D" shaped. In this regard, a generally flat, or planar, (i.e., non-rounded) internal surface 182 of outer sleeve 130 may define a portion of nut orifice 172. The D-shape of nut orifice 172 and nut 134, tends to prevent or restrict rotation of nut 134 relative to outer sleeve 130.

In accordance with various embodiments, an outer surface 186 of head portion 146 may be configured in a D-shape. In this regard, a flat portion 188 of outer surface 186 may be generally flat, or planar (i.e., non-rounded). With combined reference to FIG. 2A and FIG. 4B, the flat portion 188 of head portion 146 may contact a flange, or "lip", 190 of first vertical wall 102. The interference between flange 190 and flat portion 188 may prevent or restrict rotation of outer sleeve 130 relative to roller tray 100.

Figure 5A:
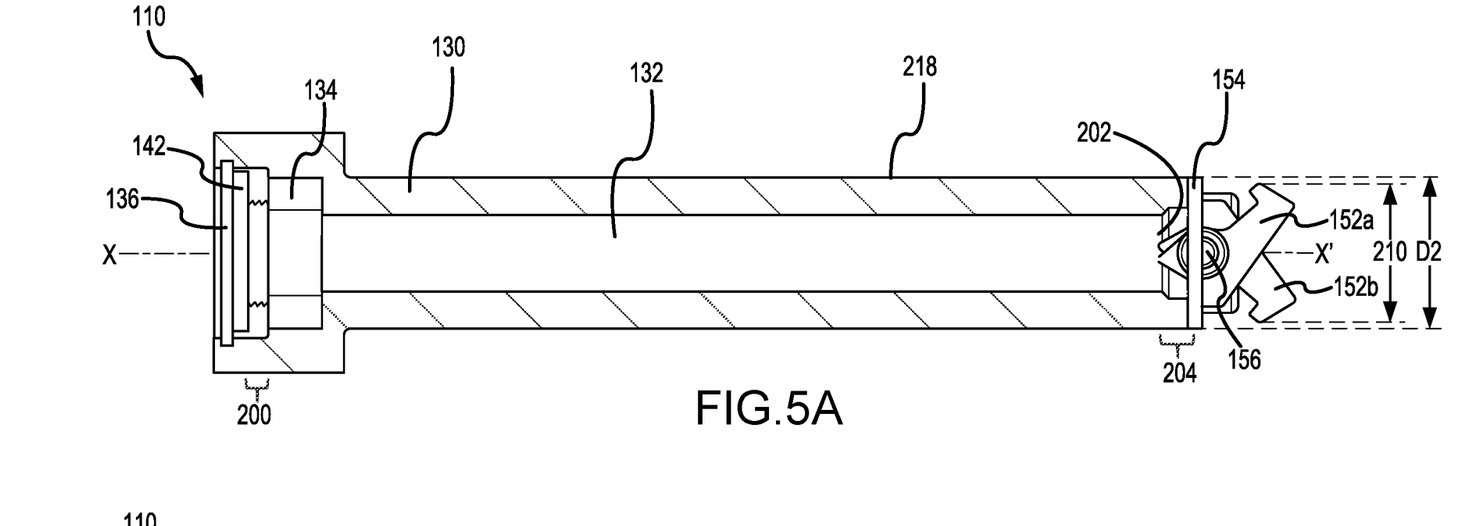
FIGS. 5A and 5B illustrate a blind spacer assembly in an unlocked state and a locked state, respectively, in accordance with various embodiments.

With reference to FIG. 5A, blind spacer assembly 110 is illustrated in an unlocked state. In the unlocked state, head 142 of screw 132 is located proximate retaining ring 136 and/or a distance 200 from nut 134. A pawl end 202 of screw 132 is located a distance 204 from pin 156. Pawl end 202 is axially opposite head 142 of screw 132. In the unlocked state, pawls 152a, 152b are free to rotate about pin 156. In this regard, in the unlocked state, pawls 152a, 152b may be rotated to a position where a distance 210 between pawl 152a and pawl 152b is equal to or less than the diameter D2 of shaft portion 164 of outer sleeve 130. Positioning pawls 152a, 152b such that distance 210 is less than or equal to diameter D2, allows pawls 152a, 152b to be inserted through spacer openings 112, 114, with momentary reference to FIG. 2B. Distance 210 is measured between the two distal most points on pawls 152a, pawl 152b (i.e., the points on pawls 152a, 152b that are farthest apart from one another) at a given pawl orientation. In this regard, in the unlocked state, each of pawl 152a and pawl 152b may be located completely radially inward of a radially outward surface 218 of shaft portion 164 of outer sleeve 130 (i.e., radially inward of diameter D2).

Figure 5B:
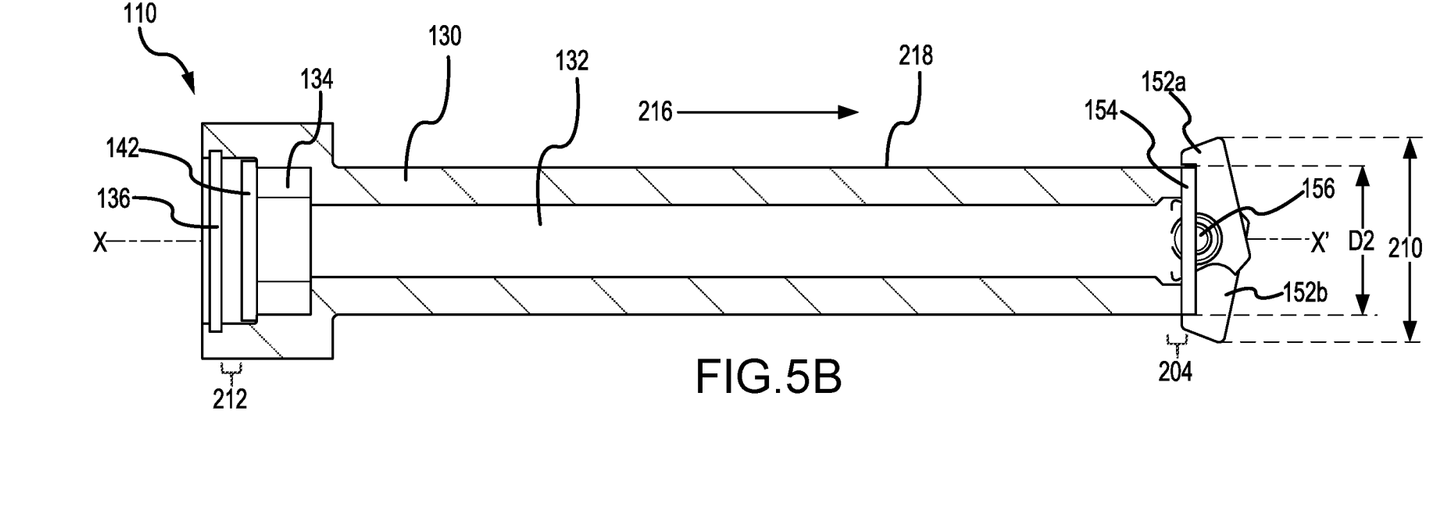

With reference to FIG. 5B, blind spacer assembly 110 is illustrated in a locked state. In the locked state, head 142 of screw 132 is located proximate nut 134 and/or a distance 212 from retaining ring 136. In this regard, to translate blind spacer assembly 110 to the locked stated, head 142 is translated away from retaining ring 136 and toward nut 134, and pawl end 202 of screw 132 is translated toward pin 156. Stated differently, distance 200 between head 142 and nut 134 and distance 204 between pawl end 202 and pin 156 are decreased, in response to blind spacer assembly 110 being translated to the locked stated. In accordance with various embodiments, screw 132 may be configured to translate axially via its threaded engagement with nut 134. In this regard, rotation of screw 132 about center axis X-X', causes screw 132 to translate axially relative to outer sleeve 130. Translation of screw 132 toward pin 156 (i.e., in the direction of arrow 216) forces pawls 152a, 152b to rotate about pin 156. In the locked state, distance 210 between pawls 152a, 152b is greater than diameter D2 and greater than the diameter of spacer opening 114 in FIG. 2B. In the locked state, screw 132 prevents or restricts rotation of pawls 152a, 152b such that pawls 152a, 152b are maintained in a position where distance 210 is greater than diameter D2 and the diameter of spacer opening 114 in FIG. 2B. In this regard, in the locked state, at least a portion of pawl 152a and/or of pawl 152b is located radially outward of radially outward surface 218 of shaft portion 164 (i.e., radially outward of diameter D2).

Figure 6A:
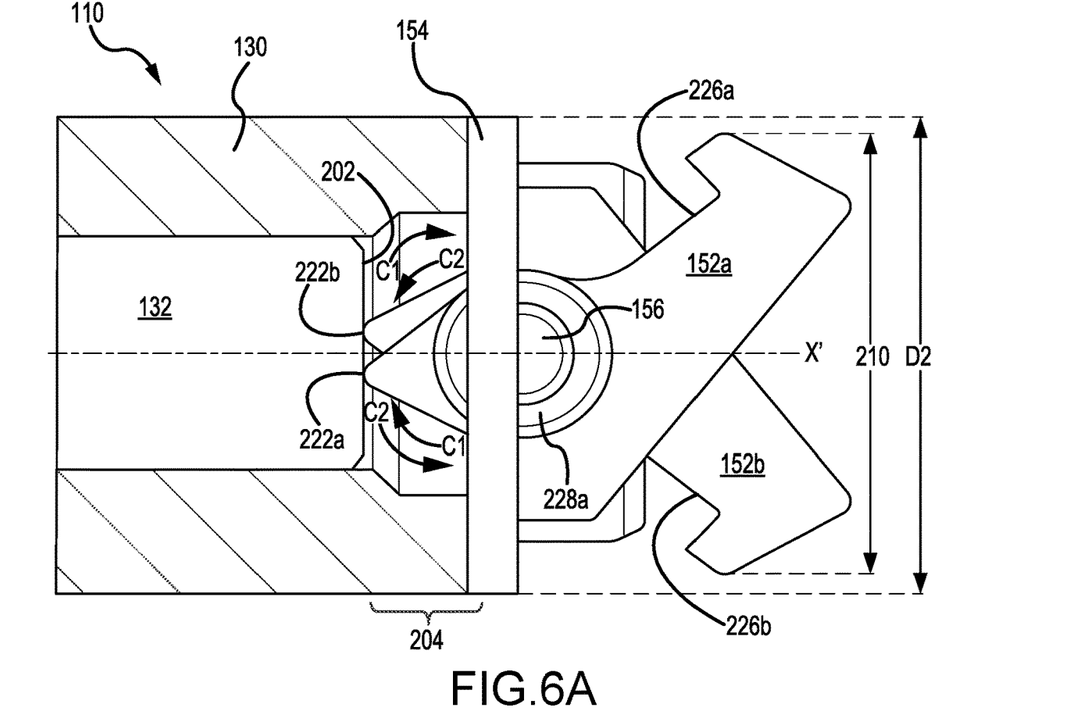
FIGS. 6A and 6B illustrate the pawl end of a blind spacer assembly in an unlocked state, in accordance with various embodiments.
Figure 6B:
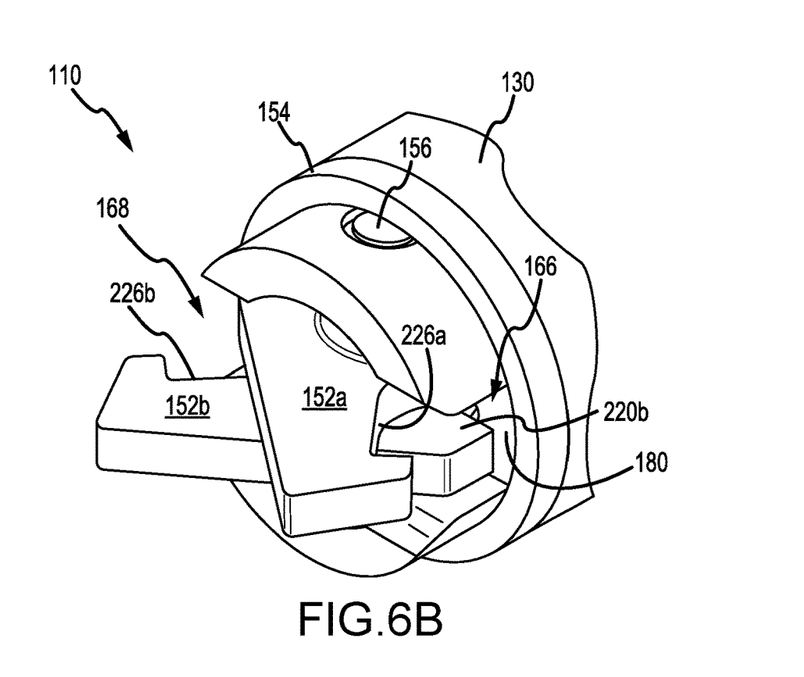

With reference to FIGS. 6A and 6B, additional details of blind spacer assembly 110 and pawls 152a, 152b are illustrated. In accordance with various embodiments, in the unlocked stated, an unlocked interference surface 220a, with momentary reference to FIG. 7, of pawl 152a may contact end 180 of outer sleeve 130, thereby restricting rotation of pawl 152a in a first circumferential direction C1 about pin 156, and an unlocked interference surface 220b of pawl 152b may contact end 180 of outer sleeve 130, thereby restricting rotation of pawl 152b in a second circumferential direction C2 about pin 156, opposite the first circumferential direction C1. In response to translation of screw 132 toward pin 156, pawl end 202 of screw 132 may contact and apply a force against an interference point 222a of pawl 152a and an interference point 222b of pawl 152b. The force applied by screw 132 may force pawl 152a to rotate about pin 156 in second circumferential direction C2, thereby rotating unlocked interference surface 220a away from end 180 and rotating a locked interference surface 226a of pawl 152a toward collar 154. The force applied by screw 132 may also force pawl 152b to rotate about pin 156 in first circumferential direction C1, thereby rotating unlocked interference surface 220b away from end 180 and rotating a locked interference surface 226b of pawl 152b toward collar 154.

In accordance with various embodiments, pawl channel 166 may receive locked interreference surface 226a of pawl 152a and unlocked interference surface 220b of pawl 152b. Pawl channel 168 may receive locked interreference surface 226b of pawl 152b and unlocked interference surface 220a of pawl 152a.

Figures 7, 8A:
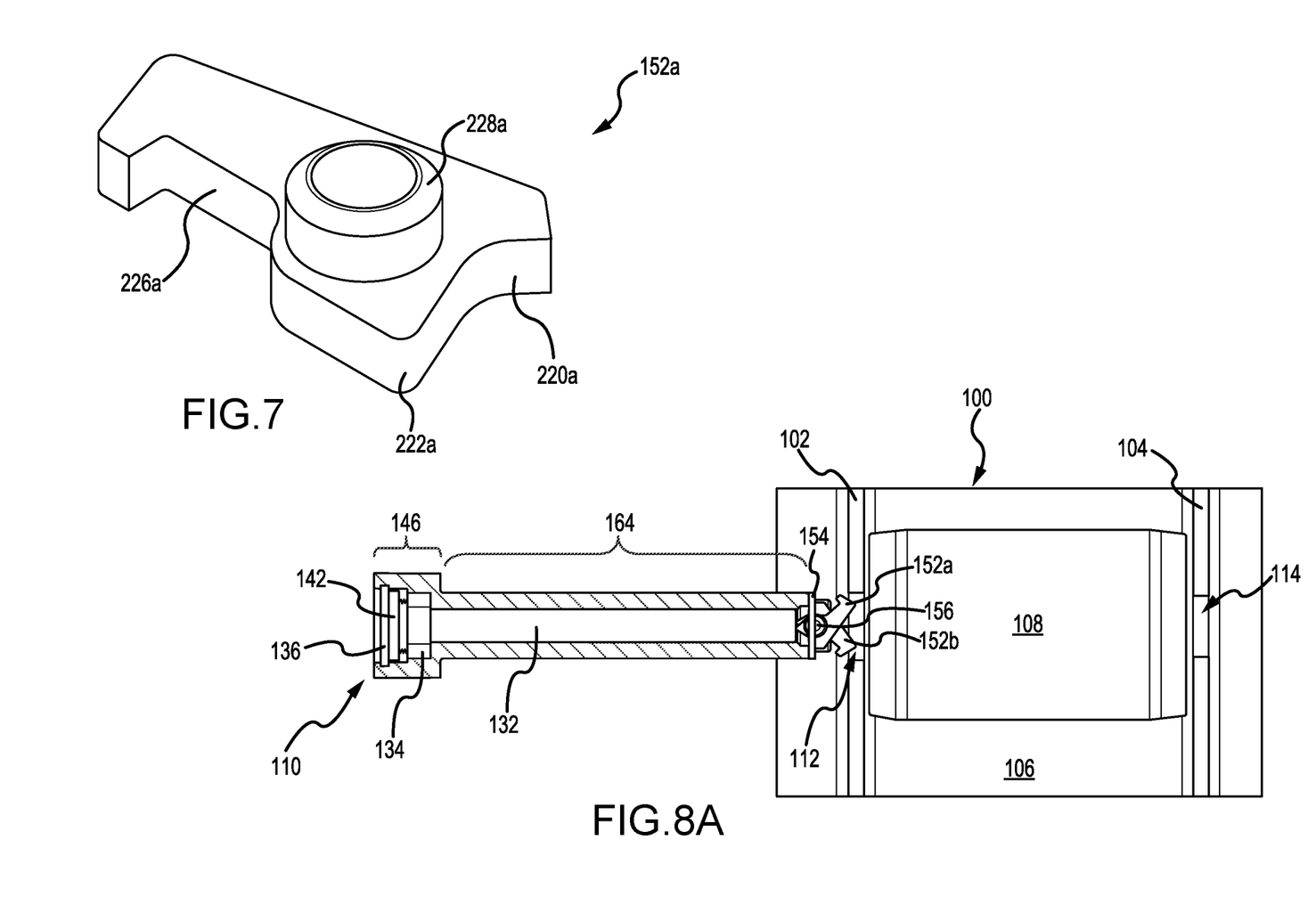
FIG. 7 illustrates a pawl of a blind spacer assembly, in accordance with various embodiments.
FIGS. 8A, 8B, and 8C illustrate insertion of a blind spacer assembly, in accordance with various embodiments.

With reference to FIG. 7, features of pawl 152a are illustrated. While FIG. 7 illustrates features of pawl 152a, it is contemplated and understood that pawl 152b, with momentary reference to FIG. 6A, includes the features and functionalities as described herein with reference to pawl 152a. In various embodiments, pawl 152a includes a protrusion 228a. Protrusion 228a is oriented away from a protrusion 228b (with momentary reference to FIG. 3B) of pawl 152b. Pin 156 may be located through protrusions 228a, 228b. Protrusions 228a, 228b tend to prevent or restrict pawls 152a, 152b from translating axially along pin 152 (i.e., from translating in a direction parallel to the axis of rotation of pawls 152a, 152b).

Figure 8B:
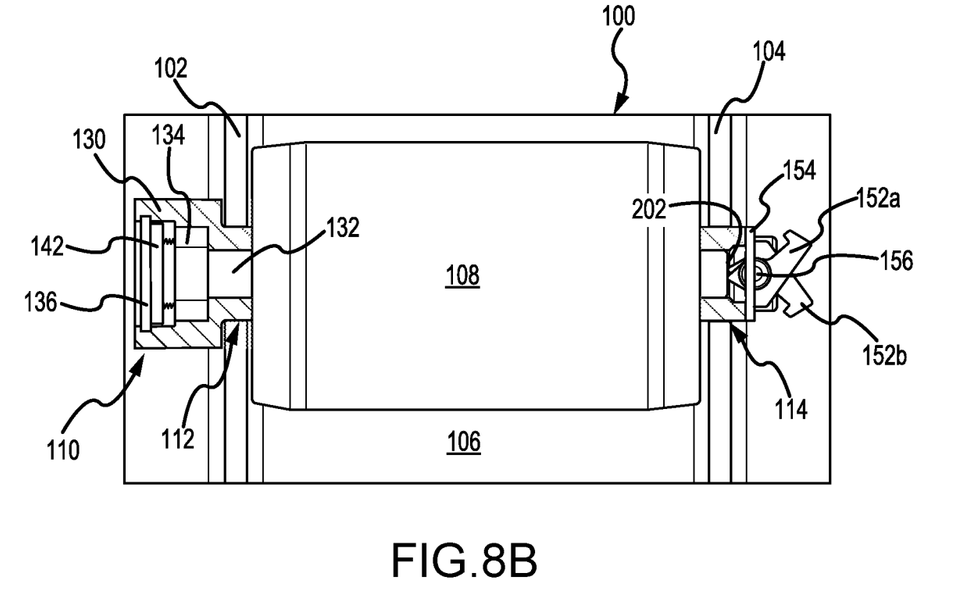
Figure 8C:
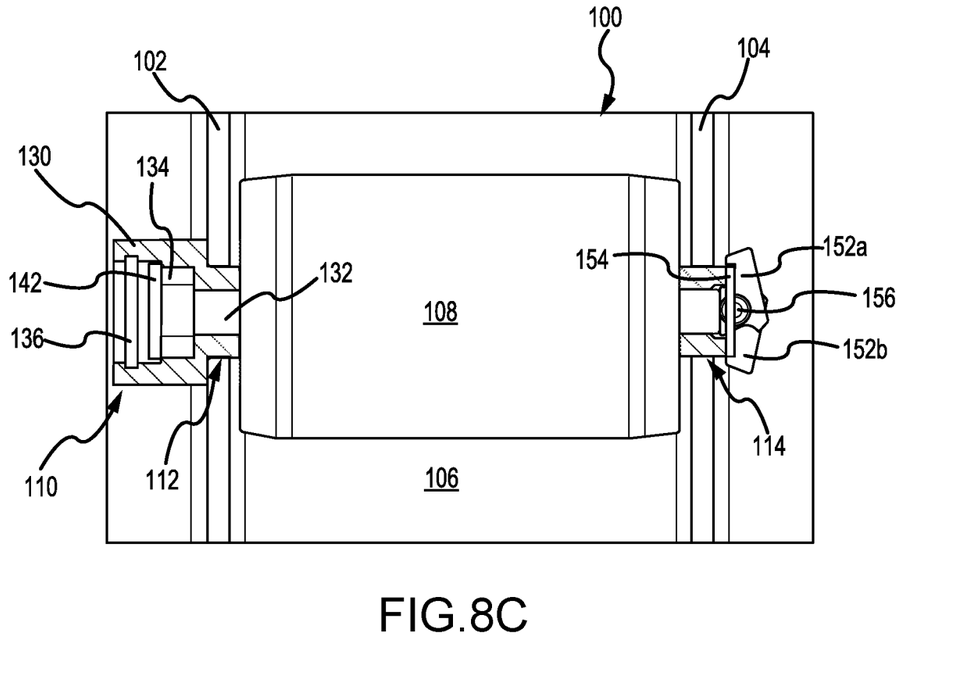

With reference to FIGS. 8A, 8B, and 8C, installation of a roller 108 and a blind spacer assembly 110 in a roller tray 100 is illustrated. In accordance with various embodiments, roller 108 is located between first vertical wall 102 and second vertical wall 104, and in particular between spacer opening 112 and spacer opening 114. Blind spacer assembly 110 is inserted through spacer opening 112, roller 108, and spacer opening 114, with blind spacer assembly 110 in the unlocked state. In this regard, when blind spacer assembly 110 is inserted, pawls 152a, 152b are free to rotate about pin 156. With blind spacer assembly 110 in the unlocked state, contact between pawls 152a, 152b and first vertical wall 102, between pawls 152a, 152b and roller 108, and/or between pawls 152a, 152b and second vertical wall 104 forces pawls 152a, 152b radially inward and/or into a position wherein distance 210, with momentary reference to FIG. 6A, is less than the diameter of spacer opening 112 and/or the diameter of spacer opening 114. The axial length of shaft portion 164 of outer sleeve 130 is selected such that collar 154 is located outside spacer opening 114 and second vertical wall 104, when head portion 146 is in a state where head portion 146 contacts first vertical wall 102. Stated differently, second vertical wall 104 is located axially between collar 154 and roller 108 when head portion 146 is in a state where head portion 146 is in contact with first vertical wall 102.

After inserting pawl portion 162 through second vertical wall 104, blind spacer assembly 110 is translated to the locked state, as shown in FIG. 8C. In this regard, screw 132 is translated toward nut 134 and pin 156, thereby causing pawls 152a, 152b to rotate to a position wherein distance 210 is greater than the diameter of spacer opening 114. For example, in various embodiments, screw 132 may be translated toward pin 156 (i.e., blind spacer assembly 110 is translated to the locked state) by inserting a tool in tool orifice 144, with momentary reference to FIG. 3B, and rotating the tool in a first circumferential direction (e.g., clockwise) about center axis X-X'. Screw 132 may be rotated until head 142 contacts nut 134. Head 142 contacting nut 134 may restrict further rotation of screw 132 in the first circumferential direction about center axis X-X'. An axial length of screw 132 is selected such that when head 142 contacts nut 134, pawls 152a, 152b are in position to generate an interference with second vertical wall 104. The position of screw 132 in the locked state prevents or blocks pawls 152a, 152b from rotating to a position, wherein distance 210 is less than the diameter of spacer opening 114. In this regard, in the locked state, the interreference between pawls 152a, 152b and second vertical wall 104 secures and/or couples blind spacer assembly 110 to roller tray 100. Should roller 108 need to be removed from roller tray 100, blind spacer assembly 110 may be translated to the unlocked stated by translating screw away from pin 156 (e.g., by rotating screw 132 in a counterclockwise direction about center axis X-X'). In the unlocked state, blind spacer assembly 110 may be translate out second vertical wall 104, roller 108, and first vertical wall 102, as pawls 152a, 152b are free to rotate to a position wherein distance 210 is less than the diameters of spacer openings 112, 114. Blind spacer assembly 110 can thus be translated between a locked state and an unlock state from a single side of blind spacer assembly 110 (i.e., by accessing head 142 of screw 132). Blind spacer assembly 110 may be employed in location where access to the side of second vertical wall 104 opposite roller 108 is limited. Further, blind spacer assembly 110 may reduce a probability that unauthorized personnel will remove roller 108, as only persons with access to a tool complementing the shape of tool orifice 144 will be able to lock and unlock blind spacer assembly 110.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A blind spacer assembly for a cargo handling system roller, the blind spacer assembly comprising:
    an outer sleeve;
    a pin located through the outer sleeve, wherein the pin is perpendicular to a center axis of the outer sleeve; and
    a first pawl configured to rotate about the pin.

2. The blind spacer assembly of claim 1, wherein the outer sleeve defines a head portion having a first diameter and a shaft portion having a second diameter less than the first diameter.

3. The blind spacer assembly of claim 2, wherein in an unlocked state, the first pawl is radially inward of a radially outward surface of the shaft portion of the outer sleeve, and wherein in a locked state, a portion of the first pawl is located radially outward of the radially outward surface of the shaft portion of the outer sleeve.

4. The blind spacer assembly of claim 3, further comprising:
    a nut located in the outer sleeve; and
    a screw in threaded engagement with the nut, wherein translation of the screw towards the pin is configured to rotate the first pawl in a first circumferential direction about the pin.

5. The blind spacer assembly of claim 4, further comprising a second pawl configured to rotate about the pin, wherein translation of the screw towards the pin is configured to rotate the second pawl in a second circumferential direction about the pin opposite the first circumferential direction.

6. The blind spacer assembly of claim 4, further comprising a retaining ring located in the outer sleeve, wherein a head of the screw is located between the retaining ring and the nut.

7. The blind spacer assembly of claim 2, wherein a nut orifice defined by the outer sleeve comprises a D-shape.

8. The blind spacer assembly of claim 2, wherein an outer surface of the head portion of the outer sleeve is configured in a D-shape.

9. The blind spacer assembly of claim 2, further comprising a collar located over the pin.

10. The blind spacer assembly of claim 9, wherein the outer sleeve further comprises a pawl portion having a third diameter less than the second diameter of the shaft portion, and wherein the pin is located through a pin orifice defined by the pawl portion of the outer sleeve.

11. The blind spacer assembly of claim 10, wherein the pawl portion defines a pawl channel configured to receive the first pawl.

12. A roller tray for a cargo handling system, the roller tray comprising:
    a first vertical wall defining a first spacer orifice;
    a second vertical wall defining a second spacer orifice;
    a roller located between the first vertical wall and the second vertical wall; and
    a blind spacer assembly located through the first vertical wall, the roller, and the second vertical wall, the blind spacer assembly comprising:
        an outer sleeve;
        a pin located through the outer sleeve, wherein the pin is perpendicular to a center axis of the outer sleeve; and
        a first pawl configured to rotate about the pin.

13. The roller tray of claim 12, wherein the blind spacer assembly further comprises:
    a nut located in the outer sleeve; and
    a screw in threaded engagement with the nut, wherein translation of the screw towards the pin is configured to rotate the first pawl in a first circumferential direction about the pin.

14. The roller tray of claim 13, wherein the blind spacer assembly further comprises a second pawl configured to rotate about the pin, and wherein translation of the screw towards the pin is configured to rotate the second pawl in a second circumferential direction about the pin opposite the first circumferential direction.

15. The roller tray of claim 14, wherein the first pawl includes a first protrusion oriented away from the second pawl, and wherein the second pawl includes a second protrusion oriented away from the first pawl, wherein the pin is located through the first protrusion and the second protrusion.

16. The roller tray of claim 13, wherein the outer sleeve of the blind spacer assembly defines a shaft orifice having a first diameter, a nut orifice having a second diameter greater than the first diameter, and head orifice having a third diameter greater than the second diameter.

17. The roller tray of claim 16, wherein the outer sleeve further defines a retaining ring orifice having a fourth diameter greater than the third diameter.

18. The roller tray of claim 16, wherein the outer sleeve further defines a pawl orifice having a fifth diameter greater than the first diameter.

19. A blind spacer assembly, comprising:
    an outer sleeve;
    a pin located through the outer sleeve;
    a first pawl configured to rotate about the pin;

a second pawl configured to rotate about the pin;
a collar coupled to the outer sleeve and located over the pin;
a nut located in the outer sleeve; and
a screw in threaded engagement with the nut.

20. The blind spacer assembly of claim 19, wherein translation of the screw towards the pin is configured to rotate the first pawl and the second pawl about the pin and into a position wherein at least a portion of at least one of the first pawl or the second pawl is located radially outward of a radially outward surface of the outer sleeve.

\* \* \* \* \*